Dec. 19, 1967   L. L. LEPOIX ET AL   3,358,583
HOUSEHOLD APPLIANCE FOR PRODUCING EXTRACTS
OF COFFEE, TEA AND THE LIKE
Filed July 30, 1964

INVENTORS
L. L. Lepoix
A. Plechinger

Watson, Cole, Grindle & Watson
Attys.

United States Patent Office 3,358,583
Patented Dec. 19, 1967

3,358,583
HOUSEHOLD APPLIANCE FOR PRODUCING EXTRACTS OF COFFEE, TEA AND THE LIKE
Louis L. Lepoix, Quettigstrasse 10A, Baden-Baden, Germany, and Alfred Plechinger, Hohentwietstrasse 6, Schwenningen (Neckar), Germany
Filed July 30, 1964, Ser. No. 386,191
Claims priority, application Germany, Aug. 2, 1963, W 30,922
1 Claim. (Cl. 99—307)

The invention relates to a household appliance for producing extracts of coffee, tea and the like, with a cold water container and a through-flow heater connected therewith by a tube, a plug-in tube for the scalding water connected to the heater and a vessel for catching the scalding water.

Appliances of this type are themselves known. The invention has for its object to improve the known machines in such a way that they are more easy to manipulate and manufacture, and in particular can be made from plastic substances. The invention is characterized in that the cold water container and the scalding water catching vessel are arranged on a tray-like base plate provided with lateral parts for holding. The base plate is preferably constructed as a multiple part housing for receiving the electrical connections of the appliance. The base plate is preferably drawn upwards in the form of a column for receiving the cold water container and this column has at its upper end apertures for the passage of air. At the same time the portion of the column provided with apertures may be separate from the lower portion of the column and clamped between this and the cold water container.

Figure 1:
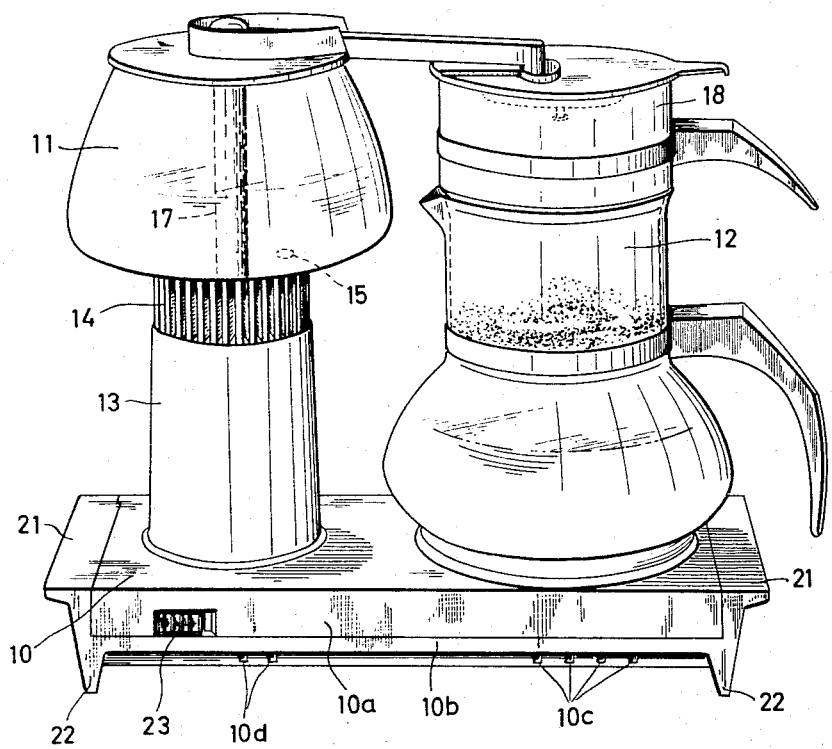
Figure 2:
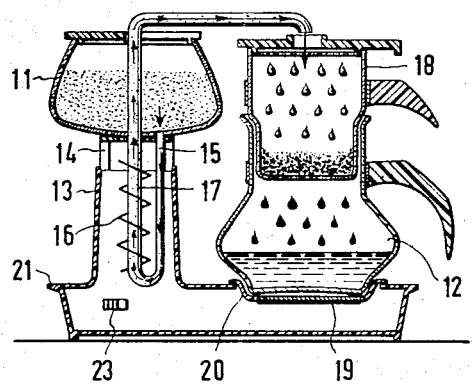

An embodiment of the invention is hereinafter described by way of example with reference to the accompanying drawing, in which FIG. 1 is a perspective view of the appliance, and
FIG. 2 is a vertical section of the appliance on a smaller scale.

The base plate as a whole is designated by 10 and carries the cold water container 11 and scalding water catching vessel 12. The base plate 10 is drawn upwards to form a column 13 supporting the cold water container 11 and provided with apertures at its upper end 14. The upper part 14 of the column is separated from the lower part 13 and clamped between the cold water container 11 and the lower part 13 of the column.

A tube 15 extends from the cold water container 11 and conducts the water to a through-flow heater 16 which heats the water which passes through a riser tube 17 to the scalding water catching vessel 12 or to a filter 18 placed thereon.

A heating plate 19 serves as support for the scalding water catching vessel 12 and is accommodated in a flange 20 drawn downwards from the base plate 10.

The base plate is in the form of a rectangular tray with lateral parts 21 for holding. It is constructed as a housing composed of an upperpart 10a and a lower part 10b and serves for accommodating the electrical connections and the like of the appliance. The lower part 10b is made in one piece with the lateral holding parts 21 and on this piece composed of the parts 10b and 21 foot rails 22 are formed to ensure a firm stand for the appliance.

Apertures 10c and 10d are provided in the lower part 10b for the passage of air. In this manner a circulation of air can take place within the housing in that cold air enters through the apertures 10c and 10d and air heated by the heating plate passes out through slots in the part 14. This prevents to a great extent heating of the material so that the appliance can be made from plastic materials. This is facilitated by the simple construction of the base plate which consists substantially of a flat surface with longitudinal edges bent over at an angle. One of these bent over longitudinal edges can be provided with an aperture for accommodating an electric switch 23.

I claim:

Electric household appliance for producing extracts of coffee, tea and the like, comprising an enclosed plastic tray-like base plate having air inlet apertures therein, a column projecting upwardly from one end of the base plate and having a peripheral apertured section in communication with said air inlet apertures in the base plate, a cold water container provided on the apertured section of the column, said apertured section of the column being clamped between the cold water container and a lower part of the column, a riser tube connected to the bottom of the container and extending down into the column and back up through the container and finally leading to a hot water receiving vessel, and an electric heater around the tube and in the column to heat the water in the portion of the tube which extends back up to the container.

References Cited

UNITED STATES PATENTS

| 1,481,258 | 1/1924 | Gardiner | 99—315 |
| 2,097,681 | 11/1937 | Wolcott | 99—281 |
| 2,846,938 | 8/1958 | Brandl | 99—307 X |

FOREIGN PATENTS

| 1,045,423 | 6/1953 | France. |
| 603,243 | 3/1960 | Italy. |
| 163,836 | 11/1933 | Switzerland. |

WILLIAM I. PRICE, *Primary Examiner.*